(12) United States Patent
Tang et al.

(10) Patent No.: US 8,838,846 B1
(45) Date of Patent: Sep. 16, 2014

(54) AUTONOMOUS, MULTI-CHANNEL USB DATA ACQUISITION TRANSDUCERS

(71) Applicant: Crystal Instruments Corporation, Santa Clara, CA (US)

(72) Inventors: Zhengge Tang, San Jose, CA (US); Lei Chen, HangZhou (CN); Jianguo Yu, HangZhou (CN)

(73) Assignee: Crystal Instruments Corporation, Santa Clara, CA (US)

( * ) Notice: Subject to any disclaimer, the term of this patent is extended or adjusted under 35 U.S.C. 154(b) by 0 days.

(21) Appl. No.: 13/929,321

(22) Filed: Jun. 27, 2013

(51) Int. Cl.
*G06F 3/00* (2006.01)
*G06F 13/38* (2006.01)

(52) U.S. Cl.
CPC .................................. *G06F 13/385* (2013.01)
USPC ............................................. 710/18; 713/503

(58) Field of Classification Search
None
See application file for complete search history.

(56) References Cited

U.S. PATENT DOCUMENTS

| | | | |
|---|---|---|---|
| 6,625,743 B1 * | 9/2003 | Gulick | 713/400 |
| 7,421,251 B2 * | 9/2008 | Westwick et al. | 455/85 |
| 7,493,510 B2 * | 2/2009 | Sung et al. | 713/503 |
| 7,539,793 B2 * | 5/2009 | Foster et al. | 710/61 |
| 8,412,975 B2 | 4/2013 | Foster | |
| 2004/0189405 A1 * | 9/2004 | Shah et al. | 331/57 |
| 2005/0007205 A1 * | 1/2005 | Bridger | 331/108 C |
| 2007/0174727 A1 * | 7/2007 | Liao et al. | 714/43 |
| 2008/0316867 A1 * | 12/2008 | Cheng et al. | 368/9 |

\* cited by examiner

*Primary Examiner* — Elias Mamo
(74) *Attorney, Agent, or Firm* — Thomas Schneck

(57) ABSTRACT

A circuit and method of analog data acquisition synchronization from an analog sensor in multiple channels associated with a USB hub. An analog to digital converter connected to the sensor that is part of a USB device has a time and phase corrected sampling clock that is referenced to a start-of-frame traffic signal with a preconfigured message indicating a time offset or delay seen upstream through a USB port. A plurality of similar devices are autonomously synchronized by the same message for multi-channel data acquisition by a locally generated trigger signal that allows a preset amount of delay set by the message. An accelerometer is a preferred sensor for such multi-channel data acquisition.

15 Claims, 3 Drawing Sheets

AUTONOMOUS, MULTI-CHANNEL USB DATA ACQUISITION TRANSDUCERS

TECHNICAL FIELD

The invention relates to apparatus for multi-channel data acquisition and, in particular, to time-synchronized transducers for use with a USB hub.

BACKGROUND ART

Transducers, particularly accelerometers, are used in multi-channel acquisition of test data. In the fields of mechanical machine monitoring, industrial measurement and control, structural monitoring, vehicular testing and monitoring, wind loading, collisions, construction, shock sensing, earth movement, position sensitive manufacturing and assembly, plus many other applications, all require measurement of proper acceleration, usually at multiple locations. Among the most sensitive accelerometers are piezoelectric sensors that are able to translate changing force, particularly impacts, and the resulting mechanical motion or vibration into electrical signals. Another type of accelerometer, perhaps less sensitive, usually manufactured as an integrated circuit, is the MEMS type that consists of a cantilevered beam moving in an enclosure. Two beams in different planes can report two-dimensional motion. The website http://arduino.cc/en/Tutorial/Memsic2125 shows a chip accelerometer with a circuit that includes an analog to digital conversion circuit having two output data leads, X and Y reporting two dimensional accelerometer digital data to a circuit board associated with a computer for collection of serial data. The circuit arrangement, with the accompanying software programming, is suggestive of using a Universal Serial Bus.

The Universal Serial Bus, or USB, is an industry standard serial data communication interface between computers and peripheral devices. The standard does not specify the type of computers nor the peripheral devices, but is generally applicable to any. Since the invention of the standard over 15 years ago, data transfer rates contemplated by the standard have increased significantly, but the general theory of operation has remained the same. In USB communication, a controller in the host computer polls a bus for message traffic in serial format, including traffic from hubs. A USB hub is a device that expands a single USB port associated with a computer into many ports. Hubs can be stacked, one after another in geometric fashion resembling a tree, to gain a needed number of USB ports to a present maximum of 127 ports.

It is often desirable to transmit signals from sensors through USB ports and hubs. Analog signals of one or more sensors will usually go through certain pre-conditioning analog circuitry such as filters and amplifiers, and be converted into digital data by one or more A/D converters. The digital data from the A/D converter will be fed into a processor for further processing, display or storage through a USB port or hub.

When collecting transducer data in multiple channels using multiple USB ports, there is usually a need to synchronize the time of conversion of data for the A/D converters in order to compare and analyze the relationship between signals in each channel. In U.S. Pat. No. 8,412,975 P. Foster recognized the need for multi-channel USB data synchronization. A circuit was invented having a microcontroller for observing USB traffic and decoding from a USB data stream a periodic data structure, such as a clock carrier signal, containing information about a distributed clock frequency and phase. The circuit generated a software interrupt upon receipt of a pre-defined data packet, such as a start-of-frame (SOF) packet and for passing the software interrupt to the microcontroller. In turn, the microcontroller responds to the software interrupt by generating an output signal adapted to be used as a synchronization reference signal.

What is needed is an autonomous synchronizer for a transducer of accelerometer data that will allow simultaneous data conversion of multiple transducers sharing the same USB tree. The synchronizer must be accurate enough to assure that the multiple A/D converters convert the analog signals to corresponding digital signals simultaneously, particularly for shock and vibration data, but be sufficiently simple to allow integration with the transducer.

SUMMARY OF INVENTION

The present invention features the unification of a transducer member with a time-synchronization circuit member in an appliance adapted for a USB port. Both members that form the appliance are joined on a common substrate resembling a flash drive except that the USB male connector is at the end of a cable for placement of the appliance at a desired location at a distance from a USB hub. The combination results in a self-synchronizing or autonomous transducer that can collect data along with multiple similar members, all communicating with the same USB hub or tree. The synchronization circuit features a local oscillator generating a local frequency signal and a parser circuit monitoring USB hub upstream signals to generate a base frequency signal. A frequency and phase comparator observing the two frequency signals generates a frequency and phase error signal that is fed to a processor in a feedback loop that reduces the error signal. A trigger module is also connected to the processor and to monitor USB hub upstream signals for generating a start signal with a preconfigured offset that can be determined by the processor. Upon the occurrence of the base frequency related offset at the processor the electrical gating circuit is triggered to initiate data conversion and fed into the processor at a gated time determined by a message in an upstream USB signal. The processor now has an output data stream to the USB hub that is synchronized by the start signal. Multiple USB appliances connected to a USB hub or tree will all be synchronized to identical timing.

The requirement of time synchronization of A/D converters depends on how fast sampling of analog signals occurs. For example, if the system acquires shock vibration data that changes rapidly, the time synchronization accuracy should be in the order of microseconds; if looking at the temperature data which changes relatively slowly, the time synchronization accuracy can be in the millisecond range.

A key issue that is solved is A/D data conversion synchronization, not merely clock synchronization in USB channels. In the invention, every analog to digital converter in the circuit member of the appliance operates as an autonomous data sampling channel that works at the same clock frequency, with a phase adjustment and a starting point synchronization such that there is data sampling synchronization among all similar appliances connected to the same USB hub or tree. In the invention, it is important that clock frequencies are the same among the sampling channels, with phase registration and that all channels have the same starting reference time by time gating based upon a predetermined delay message in USB traffic read by all channels such that there is starting point synchronization. This constitutes data acquisition synchronization.

DESCRIPTION OF INVENTION

Figure 1:
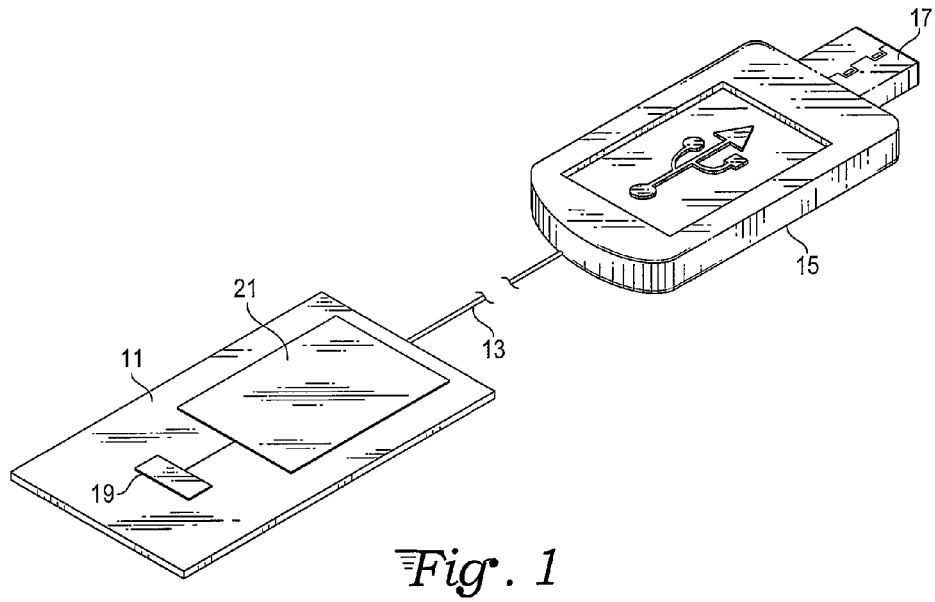
FIG. 1 is a perspective plan view of an autonomous, multi-channel USB data collection appliance in accordance with the invention.

With reference to FIG. 1, an autonomous data acquisition transducer and circuit for use with a USB hub has a support body 11 connected by a cable 13 to a conventional USB connector 15 including pins on a tongue 17 for entry into a USB hub, not shown. The pins are specified by the USE standard and include two data pins, a ground pin and a voltage pin for power transfer from the hub. The support body, typically a small circuit board, carries a transducer 19, typically an accelerometer that is connected to an integrated circuit or circuits on an IC chip 21. Transducer 19 may be fabricated as an integrated circuit, such as a MEMS device, but is preferably a miniature integrated electronic piezoelectric (IEPE) sensor. Other types of sensors, including other types of accelerometers, are known and may be substituted, such as pressure sensors, temperature sensors, optical sensors and the like. The sensor can derive power from the USB port and is always ON, so long as the USB connector is connected to a USB hub. An analog signal from the sensor is converted by the A/D converter at predetermined intervals encoded within upstream USB traffic signals in a manner such that the device is time-synchronized with the others on the USB hub by a time-gating technique described below. The function of the circuit board is to provide sensor network synchronization with multiple other similar transducers and circuits connected to the same USB hub or tree for data analysis.

Figure 2:
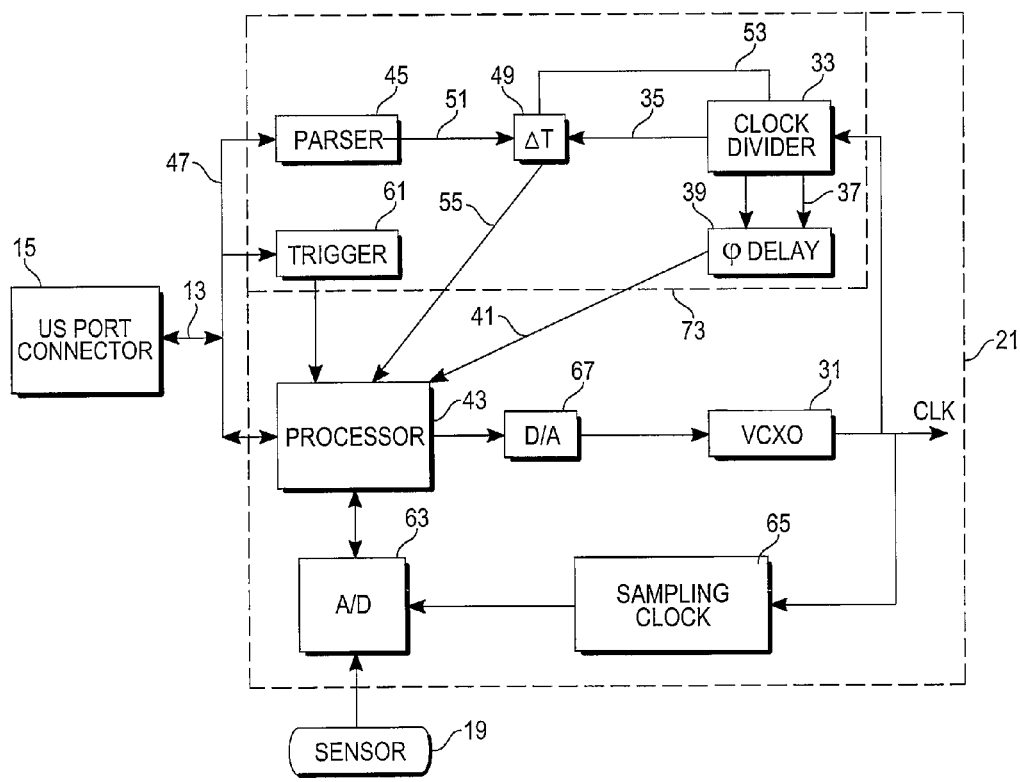
FIG. 2 is an electrical block diagram of the synchronization circuit member of the appliance of FIG. 1.

With reference to FIG. 2, the IC chip indicated by dashed line 21 may be a system on a chip (SoC), or may be an FPGA 22 in combination with a processor 43 and other circuits, or an ASIC that includes a processor or in combination with a processor. Chip 21 is connected to sensor 19 and USB connector 15, as above. Autonomous operation of similar transducers for data acquisition relies on the combination of a local oscillator that is synchronized to USB traffic, with all devices having local oscillators operating at the same frequency.

Autonomy in time synchronized data acquisition from sensor 19 is established by several circuits that rely upon a voltage controlled crystal oscillator 31 that generates 48 Mhz pulses as a local clock. The controlling voltage is a feedback error signal that will be described later. The crystal oscillator transmits its output pulses to a clock divider 33 having a 1 KHz output on line 35 and an 8 Mhz output on line 37 that goes to phase delay module 39 that will serve to send a sampling signal for phase registration on line 41 to processor 43. Use of the sampling signal will be described below in connection with phase registration in FIG. 3. While the crystal oscillator generates a 1 KHz local frequency signal, a similar signal comes from parser circuit 45. The parser circuit is a logic circuit that will generate a 1 ppms output on line 51 by monitoring USB port upstream traffic through connector 60. The parser circuit 45 is a simple packet analyzer that decodes USB packet encapsulation by monitoring USB traffic on line 47 to generate a 1.00 ms synchronized 1 ppms traffic frequency signal, plus or minus 0.0005 ms, for packets as specified by the USB standard.

The parser circuit 45 transmits the 1 ppms traffic frequency signal to a frequency and phase comparator circuit 49 on line 51. This circuit uses a 48 Mhz signal on line 53 from clock divider 33 as a time interval measurement circuit that works by comparing and producing a mathematically derived correction signal sent to processor 43 on line 55. The frequency and phase comparisons are explained below with reference to FIG. 3. However, it is readily apparent that some timing and phase differences will exist between the local frequency signal on line 35 and the base frequency signal on line 51 that is an external clock signal derived from upstream USB traffic. Pulse counting will establish a frequency lock on clock divider 33 transmitted from the frequency and phase comparator circuit 49 on line 53 to maintain clock stability for dividing the output of the crystal oscillator 31.

Time differences between the base frequency signal and the local frequency signal are resolved in the frequency and phase comparator circuit 49 that sends a time interval difference (TID) partially as feedback to the crystal oscillator 31. Processor 43 is also connected to receive upstream USB traffic signals on line 47 and can use the frequency and phase mismatch signal to synchronize on upstream USB packets.

Determination of when to synchronize comes from a trigger circuit 61 that is also observing upstream USB traffic on line 47. The trigger circuit observes start of frame indicators in message packets to generate periodic signals. A packet stream can carry a factory set identifier, such as a frame number, that is to be counted by the trigger circuit, thereby serving as a time gating signal that enables a trigger signal. In other words, no trigger signal is sent until USB traffic includes a specific identifier or frame number as a time gating indicator. Thus, if jitter or noise precludes receipt of the first few frames of upstream USB traffic, time gating established by a preset message in decoded USB traffic allows for achieving a settled stream of traffic. The trigger circuit then allows starting point synchronization of incoming data from the sensor 19 with the corrected timing signal in the processor.

Measurement sensor 19, such as an accelerometer or other sensor discussed above, transmits an analog signal to the analog-to-digital converter 63. A sampling clock 65, timed from the output of oscillator 31, drives the AD converter 63 to produce a digital data signal that goes to processor 43. Sampling clock 65 is shown receiving an input signal from crystal oscillator 31. This is the high frequency clock signal 107 described below with reference to FIG. 3. The clock edge selected by the AD converter 63 is set by a signal from trigger circuit 61 with a computed correction in processor 43, then delivered to the AD converter 63. It is very important that every AD converter in each sampling channel works at the same clock frequency, which is called sampling frequency synchronization. Not only do these frequencies need to be the same, but their clock phases also need to be the same, which is called phase match or synchronization. Phase synchronization is achieved by having the AD reset with signals from trigger circuit 61 in the processor. In combination with starting point synchronization, described above, A/D data conversion is initiated when the trigger circuit 61 receives a time gating signal indicating that a proper packet identifier has been received and decoded so that the processor can apply an appropriate time bias correction to the comparator circuit 63, thereby establishing time, phase and starting point synchronization.

Processor 43 also sends the time correction signal to the digital to analog converter 67 (DAC) that provides analog voltage feedback to the crystal oscillator 31 for fine frequency adjustment. The crystal oscillator is in a feedback loop so that time errors between the local oscillator frequency and the base frequency are reduced by small changes in the crystal oscillator frequency. Feedback is continuous because of small changes that may occur in the base frequency signal or perhaps small changes in the crystal oscillator that may be induced by temperature. In any event, the feedback loop having DAC 67, with crystal oscillator 31 and clock divider 33 tends to stabilize the local frequency signal using the time interval difference (TID) mentioned above.

The dashed line 21 indicates all of the electronic components that can be fabricated on a system on a chip (SoC). Such a system would include digital timer, phase delay and comparator circuits 45, 49, 33, 39 and 61 that can be implemented in logic such as could be fabricated on a separate FPGA chip indicated by dashed line 73, plus other components except the sensor. The processor 43 is an ARM processor, having internal memory and logic. DAC 67, crystal oscillator 31, AD converter 63 and sampling clock 65 could be on a separate chip or part of a SoC.

Figure 3:
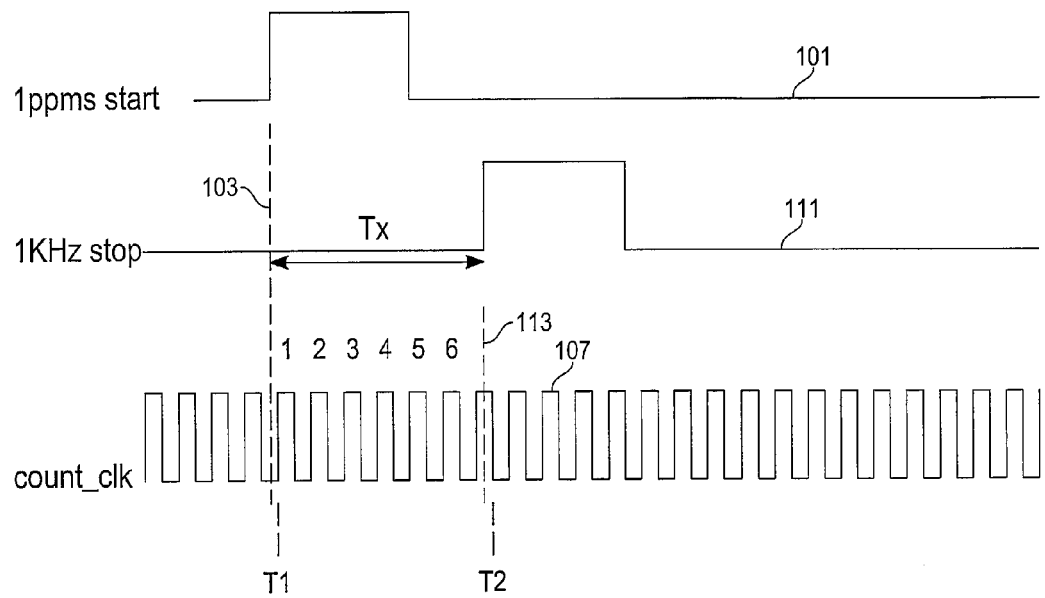
FIG. 3 is a timing diagram showing frequency and phase comparison of a local clock signal and a traffic frequency signal in the circuit diagram of FIG. 1.

With reference to FIG. 3, the plot 101 represents a 1 ppms signal generated from USB traffic by the parser 45 of FIG. 2. The rising edge of this signal is indicated by dashed line 103 that will be applied by the frequency and phase comparator circuit 49 of FIG. 2, as a start timer, to a stream of high frequency pulses 107 from clock divider circuit 33. The plot 111 represents a 1 Khz signal generated by the clock divider 33. The rising edge of this signal is indicated by dashed line 113 that is also applied by the comparator circuit 49, as a stop counting signal, to the same stream of high frequency pulses 107.

For each dashed line intercepting the stream of high frequency pulses 108, the next pulse edge of the stream establishes a time point of interest with a slight amount of phase delay. The dashed line 103 establishes the delayed time point T1 on a clock edge, while the dashed line 113 establishes the delayed time point T2 on another clock edge. These two time points establish a rough time difference between clocks. This difference is used in a synchronization calculation that also requires input from the trigger circuit 61 that is observing USB traffic and waiting for a preset frame number as a message for a gating signal that is added to the time difference for a time error signal. The time error signal is used with a phase adjustment to correct for the slight amounts of phase delay to achieve phase registration. The phase error can be seen as the interval between the dashed lines 103 and 113 as pulse edges on the one hand and clock edges of T1 and T2 on the other hand. Phase registration by this slight amount provides fine tuning to the time delay measurement. Phase synchronization must be applied to time synchronization prior to starting point synchronization.

Figure 4:
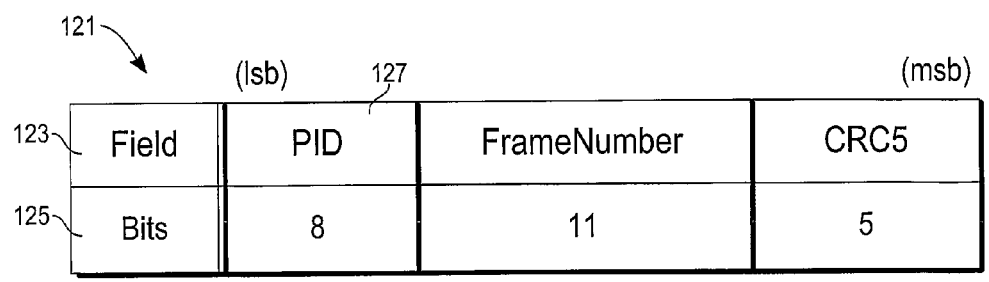
FIG. 4 is a diagram of a communications packet used for USB communication in the apparatus of FIG. 1.

With reference to FIG. 4, a USB traffic packet scheme is explained relative to block 121 where the upper portion 123 of the block is a field indicator and the lower portion 125 indicates the number of bits. This packet is sent at the standard rate of 1 ms at the upstream hub, at the beginning of a frame, and forms the basis of the 1 ppms pulse sent from the parser to the frequency and phase comparator circuit 49 in FIG. 1. Returning to FIG. 4, the first field, an 8 bit field, indicates the packet type within a frame. Of specific interest is the start-of-frame (SOF) packet. The next field 129 contains the frame number. The trigger circuit will act upon a factory specified frame number as a message that establishes time gating and so frame numbers must be counted by the trigger circuit to determine the time offset or time gating, discussed above. The number is returned to zero when it reaches a maximum number or at the end of a frame. Frequency correction, phase correction and then data acquisition by a trigger signal after time gating are all sequentially applied to traffic. In this manner, autonomous data acquisition on multiple channels is achieved by sensors sharing a USB hub or tree.

Figure 5:
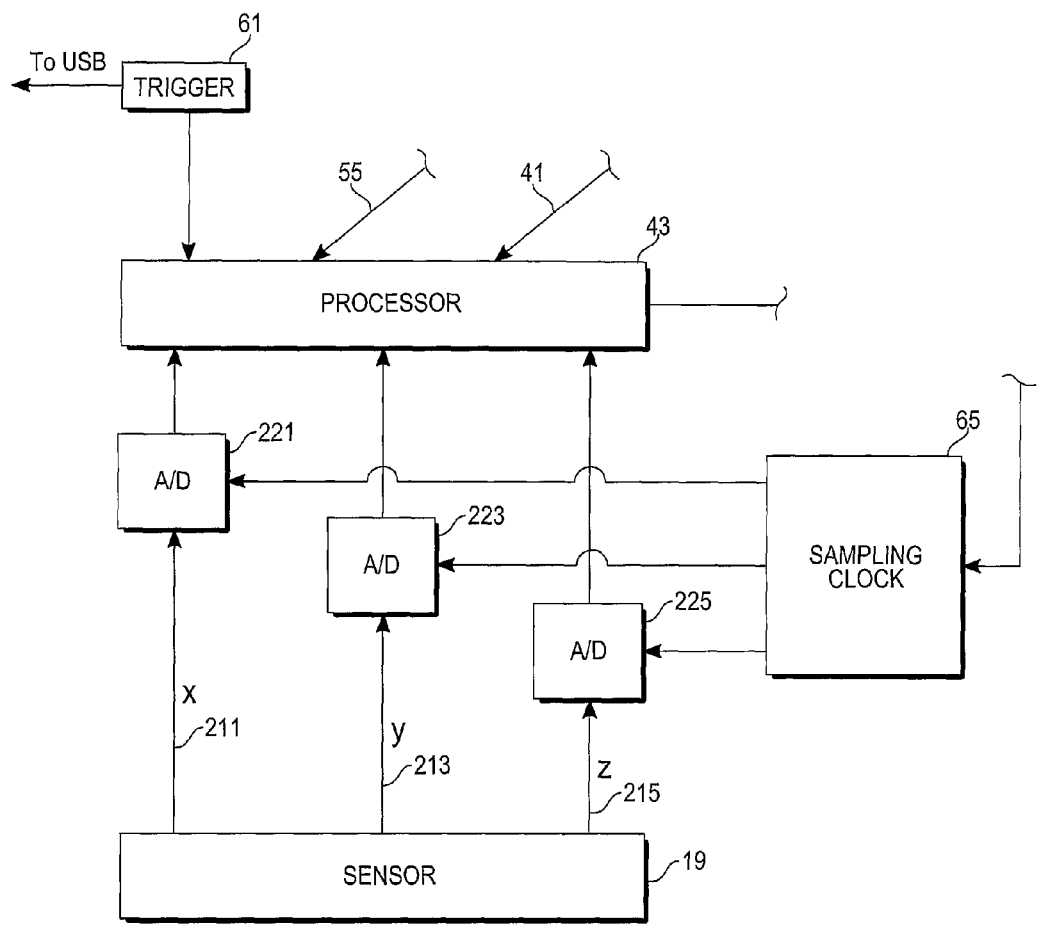
FIG. 5 is an alternative embodiment of the device of FIG. 2.

While A/D conversion synchronization has been described with reference to accelerometers in the preferred embodiment, other sensors can be used, as mentioned above. For example, with reference to FIG. 5 the sensor 19 in FIGS. 1 and 2 could be a 3-axis accelerometer, sensing acceleration in x, y, and z orthogonal directions. Such a sensor produces three analog outputs on lines 211, 213, 215 to three AD converters 211, 223, 225 clocked by sampling clock 65, as above. The processor 43 is programmed to handle one AD output at a time, applying the same time gating to trigger circuit 61 to each AD output. To assure multi-channel synchronization, the message delivered via USB traffic to trigger circuit 61 could specify the x, y, or z input being synchronized. For multi-dimensional sensors, a logical sub-division of dimensions allows the same circuitry to be used, with the same time gated correction in each dimension analogous to time-division multiplexing. Sampling rates of the ADC can be adjusted to be appropriate for the interested frequency range of the sensor. An accelerometer used in circuit described herein has a nominal frequency range of 1 KHz-20 KHz, indicating that the local crystal oscillator frequency should be substantially higher. A radio frequency crystal oscillator in the megahertz range should work for most sensors.

What is claimed is:

1. An autonomous, multi-channel, time-synchronized data acquisition transducer for use with a Universal Serial Bus (USB) hub comprising:
    an analog data sensor connected to an analog-to-digital converter having an output digital data signal, an electrical gating circuit connected to receive said output digital data signal, the circuit having:
        a voltage controlled crystal oscillator generating a local frequency signal and
        a parser circuit connected to monitor USB hub upstream signals and to generate a base frequency signal, the parser circuit connected to a frequency and phase comparator generating a frequency and phase mismatch error signal between the local and base frequency signals;
        the local frequency signal being fed into the analog-to-digital converter as a sampling clock signal governing the conversion rate from analog to digital data;
    a processor connected to the local oscillator and the parser in a feedback loop reducing said mismatch error signal; and
    a trigger module connected to the processor and to monitor USB hub upstream signals for generating a start signal from a preconfigured message indicating time gating that can be determined by the processor;
    whereby occurrence of the time gating message at the processor triggers data collection into the processor, the processor having an output to the USB hub now having synchronized collected data.

2. The apparatus of claim 1 wherein the sensor is a piezo electric accelerometer.

3. The apparatus of claim 2 wherein the data sensor is an accelerometer.

4. The apparatus of claim 2 wherein the sensor and the electrical gating circuit share the same circuit board and a power management circuit.

5. The apparatus of claim 1 wherein said feedback loop has a voltage output signal that controls the voltage controlled crystal oscillator.

6. The apparatus of claim 1 wherein the parser circuit and the frequency and phase comparator are part of a FPGA chip.

7. The apparatus of claim 6 wherein the trigger module is part of said FPGA chip.

8. The apparatus of claim 1 wherein the electrical gating circuit is a system on a chip.

9. The apparatus of claim 3 wherein the accelerometer and analog-to-digital converter and processor are packaged in the same housing connected to a USB port.

10. The apparatus of claim 3 replicated with a plurality of accelerometers connected to monitor different locations with accelerometer data transmitted to said USB hub from a plurality of electrical gating circuits gated by the same time gating message.

11. The apparatus of claim 3 wherein the accelerometer is a 3-axis accelerometer.

12. An autonomous, multi-channel data acquisition transducer for use with a Universal Serial Bus (USB) hub comprising:
   an accelerometer connected to an analog-to-digital converter having a digital data output signal representing motion;
   an electrical gating circuit connected to receive said digital data output signal, the circuit having:
      a voltage controlled crystal oscillator generating a local frequency signal and a parser circuit connected to monitor USB hub upstream signals and to generate a base frequency signal, the parser circuit connected to a frequency and phase comparator generating a frequency and phase mismatch error signal between the local and base frequency signals;
      a processor connected to the local oscillator and the parser in a feedback loop reducing said mismatch error signal; and
      a trigger module connected to the processor and to monitor USB hub upstream signals for generating a start signal from a preconfigured message indicating time gating that can be determined by the processor;
   whereby occurrence of the time gating message at the processor triggers accelerometer data collection into the processor, the processor having an output to the USB hub now having synchronized collected data.

13. The apparatus of claim 12 wherein said accelerometer is a 3-axis accelerometer having an output corresponding to each axis and having an analog to digital converter corresponding to each axis output.

14. A method for multi-channel data acquisition for Universal Serial Bus (USB) communication comprising:
   collecting analog data and converting the data to digital collected data;
   synchronizing a local clock signal frequency associated with a sensor to a base frequency seen upstream through a USB port having data packets with a preconfigured delay message;
   synchronizing the local clock signal to the base frequency signal to generate a time error signal;
   generating a trigger signal based upon monitoring upstream traffic for a message signaling a preconfigured delay that constitutes a time offset that is combined with the time error signal; and
   gating digital collected data using the trigger signal to a USB port.

15. The method of claim 14 further defined by sampling the collected analog data with a sampling clock operating the local clock frequency.

\* \* \* \* \*